United States Patent
Mundheim et al.

(10) Patent No.: US 7,374,647 B2
(45) Date of Patent: May 20, 2008

(54) ARRANGEMENT OF AN ELECTRODE, METHOD FOR MAKING SAME, AND USE THEREOF

(75) Inventors: Atle Mundheim, Bergen (NO); Lasse Kroknes, Eidsvåg I Romsdal (NO)

(73) Assignee: ORO AS, Nesttun (NO)

( * ) Notice: Subject to any disclaimer, the term of this patent is extended or adjusted under 35 U.S.C. 154(b) by 130 days.

(21) Appl. No.: 10/491,848

(22) PCT Filed: Oct. 8, 2002

(86) PCT No.: PCT/NO02/00364

§ 371 (c)(1), (2), (4) Date: Aug. 5, 2004

(87) PCT Pub. No.: WO03/038155

PCT Pub. Date: May 8, 2003

(65) Prior Publication Data

US 2004/0251129 A1 Dec. 16, 2004

(30) Foreign Application Priority Data

Oct. 10, 2001 (NO) .................................. 20014941

(51) Int. Cl.
*C25B 11/04* (2006.01)

(52) U.S. Cl. ..................... 204/290.08; 204/290.03; 204/290.12; 204/290.13; 204/290.14; 204/292; 204/293

(58) Field of Classification Search ................ 204/291, 204/292, 293, 290.01, 290.03, 290.08, 290.12, 204/290.13, 290.14; 427/123, 124, 125, 427/446, 189, 191, 192, 455, 225, 295, 456, 427/421.1, 427, 528, 576, 597, 77, 78
See application file for complete search history.

(56) References Cited

U.S. PATENT DOCUMENTS

| | | | |
|---|---|---|---|
| 4,496,453 A | | 1/1985 | Yoshida |
| 4,702,813 A | * | 10/1987 | Tenhover ..................... 205/635 |
| 4,770,949 A | * | 9/1988 | Hashimoto et al. ......... 428/687 |
| 5,531,875 A | * | 7/1996 | Shimamune et al. .. 204/290.08 |

FOREIGN PATENT DOCUMENTS

| | | |
|---|---|---|
| EP | 0 546 714 A1 | 6/1993 |
| RU | 1 788 533 A1 | 1/1993 |
| RU | 2 045 583 | 10/1995 |
| RU | 2 083 724 | 7/1997 |
| RU | 2 140 466 | 10/1999 |

* cited by examiner

*Primary Examiner*—Bruce F. Bell
(74) *Attorney, Agent, or Firm*—Francis C. Hand; Carella, Byrne, Bain et al.

(57) ABSTRACT

A device of an electrode is disclosed, comprising a core and a surface coating of electrically-conductive material, and it is characterized by that the surface coating comprises one or several layers with a pore-free surface, each with a thickness of 0.005 mm to 0.050 mm, and formed by spraying, especially with a vacuum plasma spray technique.

4 Claims, 2 Drawing Sheets

Example 1

Example 1
(Figure 1)
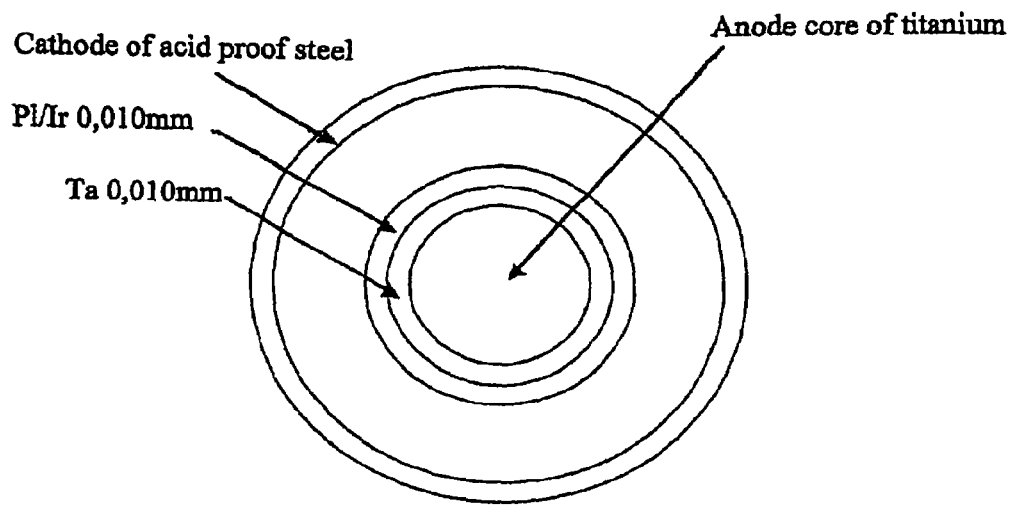
Example 2
(Figure 2)
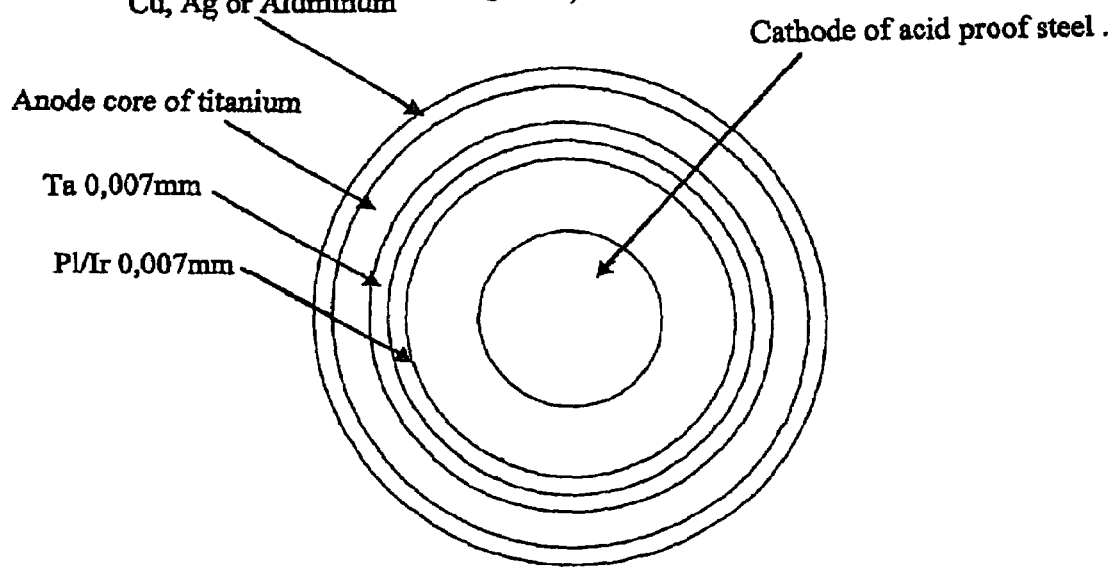

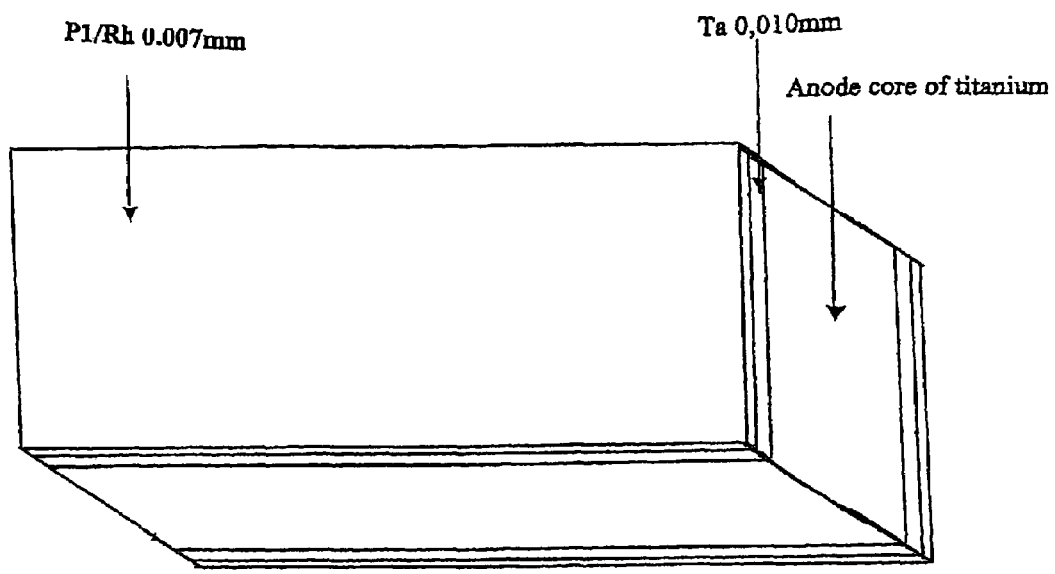
Example 3
(Figure 3)
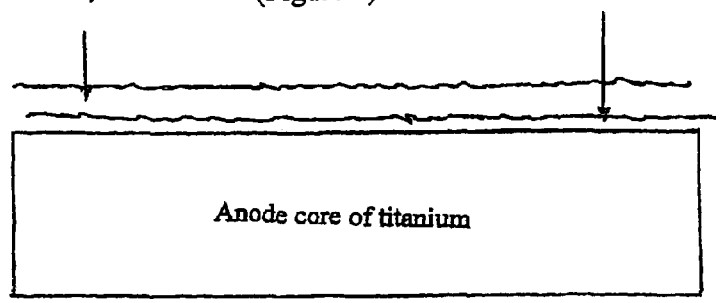
Example 4
(Figure 4)

ARRANGEMENT OF AN ELECTRODE, METHOD FOR MAKING SAME, AND USE THEREOF

The present invention concerns a device of an electrode.

Furthermore, the invention concerns a method for manufacturing an electrode. The invention also concerns a method of using the electrode.

Known Methods in Use Today

Today anodes (electrodes) are produced by using electrolysis. These electrodes have, however, a relatively short lifespan and do not tolerate exposure to high voltage for a long period of time. If They are exposed to high voltage they will bum up. These anodes are also very exposed to the particles contained in the flow of liquid, something which leads to mechanical wear and tear.

Anodes are also made of pure metals or their alloys, and which do not belong to the group of precious metals, but they are quickly eroded when used, they do not produce the desired oxidant, or cannot be exposed to the desired voltage.

There is also another less well-known method in use which involves that tantalum, platinum, iridium or a mixture of the abovementioned are rolled down to between 0.015 and 0.035 mm and welded to the core of an anode which is made of titanium, aluminium or copper. By this method friction welding is used. The lifespan of these electrodes is longer than for the electrodes made by use of electrolysis. They tolerate a considerably higher voltage (volt) and current intencity (ampere). With these advantages in variables for the electrolysis process, i.e. voltage from 0-380V and amperage from 0-1000 Amp, mixed oxidants are produced which have extremely high reactivity, strength and the possibility to functions-balance with each other the balance of the single oxidants, which exceeds the effect of, and reduces the undesired effect of, oxidants from anodes produced by other methods.

The limitations of production by this method are the amount of variation in the mixture of the alloy. For example we know that a platinum/iridium-alloy (Pt/Ir) with more than 20% iridium is difficult to roll down to the desired thickness. Up to now we know that alloys can be rolled down to ca. 33 microns (0.033 mm). Higher concentrations of Ir mean even greater problems, and the foil produced is often brittle. It is also desirable that the foil is of high hardness to increase the mechanical resistance to wear and tear. At the same time the thickness of the foil is decisive for how much of single oxidants are produced in a given liquid at a given voltage (V) and amperage (A). Further we know that for example pure platinum technically can only be rolled down to a thickness of 15 microns (0.015 mm). Under this thickness one does not get airtight foil (pores).

A purpose of the invention is to provide a new construction for an electrode as mentioned above, and which eliminates all of the disadvantages which are seen in the existing electrodes.

It is also a purpose of the invention to provide a new and improved method in which one can in a simple manner produce such an electrode which has a higher performance in use than previously known electrodes.

Further it is a purpose of the invention to provide a use for the electrode.

According to the present invention a method has been provided which lends itself to binding together different metals to produce an anode which may be used to produce a mixture of oxidants and radicals by use of electrolysis.

The core from which the anode or sheet is produced is mainly titanium, or copper, or aluminium, or silver or their alloys, or other conductive metals/alloys. Especially preferable are titanium or an alloy of titanium and palladium.

Outside the core mentioned above is sprayed a powder of different alloys in one or several layers. Typical metals in such a spray-coating are 100% tantalum or platinum or titanium or iridium or an alloy composed of a mixture of these. One can also use other precious metals such as niobium, hafnium, zirconium, ruthenium, palladium and rhodium or a mixture (an alloy) of these.

A powder composed of the abovementioned metals/alloys, or a mixture of powder from the abovementioned metals, is sprayed on the anode by use of Controlled Atmosphere Plasma Spray, that means that the spraying takes place in a substitute atmosphere of a gas, Vacuum-Plasma-Spraying (VPS), Low Vacuum Plasma Spray (LVPS) or Low Pressure Plasma Spray (LPPS). The preferred method is Vacuum Plasma Spray.

As a first layer a layer either of tantalum, niobium, hafnium, zirconium or a mixture of these may be sprayed on. Other layers will be platinum, rhodium, iridium, ruthenium, palladium, zirconium or a mixture of these.

An electrode produced by this method, and which is then used as an anode, will have a very long lifespan and will produce a very strong mixed oxidant which is suitable for oxidizing or organic materials in liquids, organic materials bound to particles in liquids, and to the destruction of cyanide and ammonia in liquids, as well as the destruction of bacteria, micro-organisms and certain viruses.

Advantages of the Present New Method.

By using the mentioned vacuum-plasma-spray method one achieves an electrode with a very long lifespan, even when it is used under extreme conditions and environments. It tolerates current up to 380V and 1000 amp without visible signs of deformation on the surface. This based on the fact that one will then obtain the same mechanical qualities as by applying foil by friction welding.

The anode which is produced by the present method can be subjected to high voltage over a long period of time, 15 volts or more. The advantage with this is that one will get production of strong oxidants such as $H_2$, $Cl_2$, $ClO_3$, $O_3$, $O_2$, $H_2O_2$, (OH), (ClOH), (O), and this is what is desired, as this are these oxidants in a balanced interplay which makes the composition of the anode unique. The scope of this balance is increased by our method. For example, if one sometimes requires small amounts of $Cl_2$ and a lot of $O_3$ to avoid the formation of chlororganic compounds. Formation of $Cl_2$ is high with great thickness on the outer layer (Pl, Pl/Ir, Pl/Rh etc.). Accordingly $O_3$ is lower at a certain Volt and Ampere. We get the opposite situation with thin outer layers in that a high production of $O_3$ and a lower production $Cl_2$ is achieved. In very many cases this is desirable to obtain a mixed oxidant which gives almost complete oxidization, and where the presence of $O_3$ and of hydroxyl radicals counteracts the possibilities of $Cl_2$ of producing chlororganic compounds where a surplus $Cl_2$ and not combusted organic materials would otherwise be present.

The scope of this balance is increased by our method by the fact that we, by plasma-spraying in vacuum obtain pore-free coatings of the layers of metals down to 0.007 mm. Rolling of foil is limited down to 0.015 for pore-free and airtight coating for pure Pl, and far higher for Pl/Ir alloys.

Likewise the mixture of the metals in the outer layer is decisive for wear and tear in situations with mechanical influence.

By spraying we can without limitations from the rolling technology and brittleness in the metal mix considerably higher concentrations of hard metals such as Ir and Rh with Pt.

As an example alloys of Pt/Rh and Pt/Ir have shown to be very effective, but today nobody has been able to roll this alloy down to the desired thickness. With the method according to the present invention one will be able to do this as one sprays the metals on the core surface. It is very simple to produce the metals we require as the metal/alloys will be in powder form before coating.

The mechanical qualities of the method according to the invention are better as regards wear and tear. We can still go down to thicknesses of layers of 0.007 mm and still maintain the scope in the oxidant production.

The area of the anode surface is of significant importance for the effect by electrolysis. With the method according to the invention one obtains an extremely rough surface in contrast to by rolling and coating by electrolysis. This to a great degree increases the area of the anode in contact with the liquid, and gives a considerably increased production of oxidant. In a case of danger of contamination of non-conductive substances on the anode, this may be polished before being used in the cell.

Another advantage is that the anode can be produced in any desired form as shown by the enclosed figures and appurtenant text. The anode may be made as a pipe, a star-shape, a rod, a disc, a perforated spiral, etc.

With for example an anode with a core of titanium we have today limitations as regards how long and thick this can be, as well as the shape as regards friction welding. This is not the case for an anode produced by electrolytic coating of metal, but there the limitation is mechanical binding to the core, as well as durability and effect. The freedom of form as a result of the coating method is considerably increased by the method according to the invention, and gives increased possibility of increasing the area of the surface of the anode in contact with the liquid, increasing the fluid dynamic effect as regards wear and tear, contact time and speed at the contact surface liquid/anode, at the same time as the requirements for optimal oxidant production is taken care of by mechanical binding, lack of pores in all layers, and variation in the thickness of the outer layer.

The device according to the invention will be further explained in the following specification under reference to the enclosed figures, wherein:

Example 1 (FIG. 1) shows a cross-section of an anode as a rod and a cathode as a pipe where the liquid can be pumped through.

Example 2 (FIG. 2) shows a cross-section where the cathode is a rod inside a pipe which is an anode. Here the liquid is pumped through the anode. The outer layer of copper has as its function to distribute electricity.

Example 3 (FIG. 3) shows a cross-section of an anode as a sheet.

Example 4 (FIG. 4) shows a cross-section of a coated material, and how this contributes to a greater surface area against the liquid.

As mentioned the anode is made of titanium or copper or aluminium or silver or an alloy of titanium/palladium or another conducting metal/alloy.

The anode can vary in size and shape according to the purpose for which it is used.

The anode can have a core consisting of titanium or copper or aluminium or silver or an alloy of titanium/palladium or another conducting metal/alloy with spray coated platinum or rhodium or iridium or ruthenium or palladium or zirconium or an alloy of these as an outer coating layer.

The anode can be hollow, i.e. a pipe and consist of metals/alloys as described above where as an outer cape in the anode a layer of more conductive material is laid to conduct the electricity, and in which the inner surface is sprayed with platinum or rhodium or iridium or ruthenium or palladium or zirconium or an alloy of these. The cathode is placed here in the inner part of the pipe (the anode).

The core of the anode is sand blasted or glass blasted to obtain a rough surface. After sand-bowing/glass-blowing the surface of the core material in the anode is cleaned chemically by using a thinner or acid. This must be done to remove dirt and fat which may lie on the surface, as well as to remove the oxygen from the metal (i.e. to remove oxides from the surface).

After the cleaning has been carried out the surface layer mentioned above is sprayed in a vacuum chamber.

The spray method used is vacuum plasma spraying, and the spraying forms a fine grained metal layer on the surface of the anode.

First a first layer of tantalum or niobium or zirconium or hafnium or alloys of these are sprayed on. A layer of between 0.005 mm and 0.050 mm is sprayed on.

The other layer which is sprayed on will be platinum, rhodium, iridium, ruthenium, palladium, zirconium or an alloy of these. The thickness of this layer will be in the area of 0.005 mm to 0.050 mm.

The advantage of this method is that the metals/alloys which are sprayed on will not change their qualities and a very hard surface which tolerates the extreme strain which occurs during the electrochemical oxidation is obtained. The method gives pore-free surface down to 0.007 mm, increased reactive area because of the roughness created and gives freedom of choice as regards the metals used in the alloys.

The invention claimed is:

1. An anode comprising
    a core;
    at least one spray coated electrically conductive layer of material on said core having a thickness of from 0.005 mm to 0.050 mm and a pore-free surface, the material of said layer being selected from the group consisting of at least one of tantalum, niobium, hafnium, zirconium and an alloy composed of any one of tantalum, niobium, hafnium and zirconium; and
    a second spray coated electrically conductive layer of material on said one layer having a thickness of from 0.005 mm to 0.050 mm and a pore-free surface, the material of said second layer being selected from the group consisting of at least one of platinum, rhodium, iridium, ruthenium, palladium, and an alloy of platinum, rhodium, iridium and palladium; and
    a third spray coated electrically conductive layer between said one layer and said second layer, the material of said third layer being selected from the group consisting of at least one of tantalum, niobium, hafnium, zirconium and an alloy of any one of tantalum, niobium, hafnium, zirconium.

2. An anode as set forth in claim 1 wherein said core is of a material selected from the group consisting of at least one of titanium, copper, aluminum, silver, an alloy of titanium/palladium and a conductive metal/alloy.

3. An anode as set forth in claim 1 wherein at least one of said one layer, said second layer and said third layer has a thickness of 0.007 mm.

4. An anode as set forth in claim 1 having a shape selected from the group consisting of a rod, a sheet and a pipe.

* * * * *